US010257227B1

(12) United States Patent
Stickle et al.

(10) Patent No.: US 10,257,227 B1
(45) Date of Patent: Apr. 9, 2019

(54) COMPUTER SECURITY THREAT CORRELATION

(71) Applicant: Amazon Technologies, Inc., Reno, NV (US)

(72) Inventors: Thomas Charles Stickle, Saint James, NY (US); Carl Jay Moses, Nokesville, VA (US); Ryan Christopher Holland, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/460,168

(22) Filed: Aug. 14, 2014

(51) Int. Cl.
*H04L 29/06* (2006.01)
*G06F 21/50* (2013.01)

(52) U.S. Cl.
CPC .............. *H04L 63/20* (2013.01); *G06F 21/50* (2013.01); *H04L 63/14* (2013.01); *H04L 63/1408* (2013.01); *H04L 63/1416* (2013.01); *H04L 63/1433* (2013.01); *H04L 63/1441* (2013.01)

(58) Field of Classification Search
CPC . H04L 63/14; H04L 63/1433; H04L 63/1441; H04L 63/1416; H04L 63/20; H04L 63/1408; G06F 21/577
See application file for complete search history.

(56) References Cited

U.S. PATENT DOCUMENTS

| | | | |
|---|---|---|---|
| 9,112,911 B1 * | 8/2015 | Karhade | H04L 63/0227 |
| 2004/0122907 A1 * | 6/2004 | Chou et al. | 709/207 |
| 2007/0180490 A1 * | 8/2007 | Renzi | G06F 21/577 726/1 |
| 2013/0074143 A1 * | 3/2013 | Bu | H04L 63/1416 726/1 |

* cited by examiner

*Primary Examiner* — Ayoub Alata
(74) *Attorney, Agent, or Firm* — Thorpe North & Western, LLP.

(57) ABSTRACT

A computer security threat sharing technology is described. An example method may include receiving security threat information transmitted over a computing network via a multi-streaming data service. The security threat information may relate to a recognized computer security threat detected by a first network component. The security threat information may then be correlated with additional security threat information received via the multi-streaming data service that may be detected by a second network component that may be interconnected to the first network component by way of the multi-streaming data service. A computer security threat associated with correlated security threat information may then be identified, and the computer security threat may be communicated to a plurality of network components via the multi-streaming data service.

19 Claims, 8 Drawing Sheets

700

Receive security threat information transmitted over a computing network via a data service , the security threat information being for a recognized computer security threat detected by a first network component — 710

Correlate the security threat information with additional security threat information received via the data service detected by a second network component that is interconnected to the first network component by way of the data service — 720

Identify a computer security threat associated with correlated security threat information — 730

Communicate the computer security threat via the data service to a plurality of network components — 740

COMPUTER SECURITY THREAT CORRELATION

BACKGROUND

Computer security infrastructure may include mechanisms by which computer equipment, information and computing services are protected from unintended or unauthorized access, changes or destruction. In an attempt to shield access to internal network services and block computer security attacks, network firewalls and similar preventative measures are often deployed at computer network borders where more private computer networks connect to more public computer networks such as the Internet.

Security information and event management (SIEM) may be used to provide analysis of security alerts generated by network hardware and network applications. Intrusion detection systems (IDSs) are also sometimes deployed to detect computer network attacks in progress and assist in post-attack forensics.

In another layer of security, a corporate computer server may request authentication credentials before allowing access to the server. A further aspect of computer security may be physical security of computer equipment from unauthorized persons. With the growing interconnectedness of computing systems and the frequent security breaches that have occurred in the past, there is an increased need for providing effective computer security.

DETAILED DESCRIPTION

Figure 1:
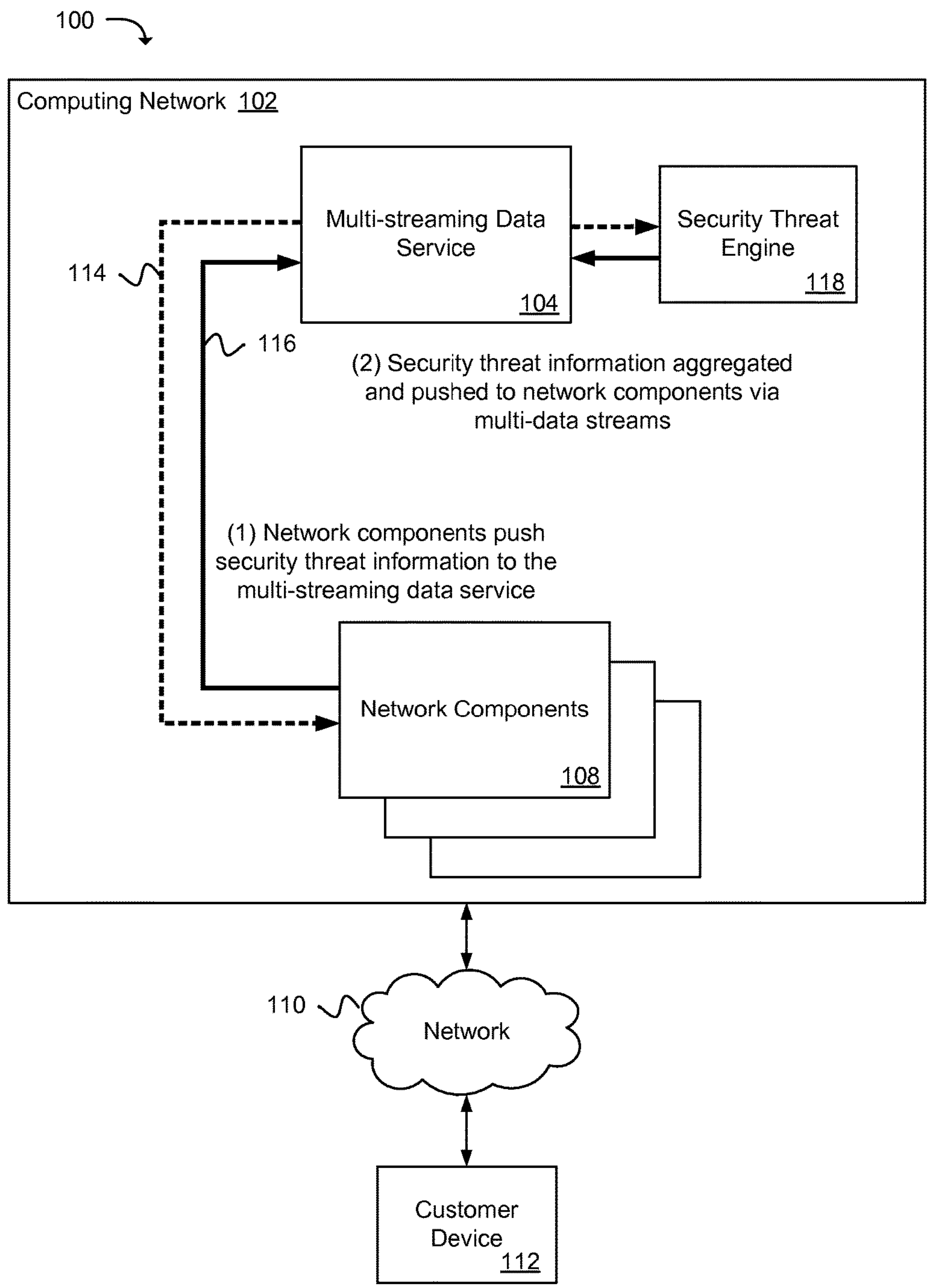
FIG. 1 is a diagram that illustrates an example of a system for computer security threat correlation.

A computer security threat correlation technology is described. In one example, the technology may be used to receive security threat information into a multi-streaming data service. Security threat information may be information associated with a specific computer security threat (e.g., virus, malware, denial-of-service attack, etc.). A multi-streaming data service may be a managed data service that can be elastically scaled to provide a data stream in parallel to multiple subscribing network components. The multi-streaming data service may transmit multiple data streams to subscribing network components within a computing network. The multiple data streams may contain security threat information published by various network components that recognize a computer security threat and submit associated security threat information to the multi-streaming data service for distribution to other network components.

Security threat information received by a network component or a security threat engine may be correlated with additional security threat information received via the multi-streaming data service. For example, correlating security threat information with additional security threat information may comprise identifying attributes in the security threat information that are in common with attributes of the additional security threat information, revealing a relationship between the security threat information and the additional security threat information.

In one example, a subscriber to the multi-streaming data service may receive security threat information from the subscriber's own computing systems and store the security threat information in memory. As additional security threat information from an outside source is received, the additional security threat information may be correlated with the security threat information stored in memory. Further, security threat information received from the multi-streaming data service may be correlated with additional security threat information retrieved from network logs, databases and/or external security entities. Illustratively, security threat information may be correlated with additional security threat information compiled by a government computer security agency or a private computer security agency.

Correlated security threat information may be used to identify a computer security threat (e.g., more accurately or more quickly), and the identified computer security threat may then be communicated to network components (e.g., to a WAF (web application firewall or border router)) included in the computing network via the multi-streaming data service. Upon receiving an identified computer security threat, network components that may be capable of reacting to the computer security threat may execute security policy instructions that may result in neutralizing the computer security threat, for example, by blocking network traffic associated with a particular URL (Uniform Resource Locator) or IP (internet protocol) address.

Often, security analysts find that small indicators discovered at different locations within a computing network, when combined, may have been important indicators signaling an impending attack on the computing network. Today, network event correlation may be performed using available vendor products, but these vendor products may not be scalable and may rely on humans (e.g., network analysts) to interpret results in order to respond to a computer security threat. As a result of the technology disclosed herein, security threat information (i.e., threat intelligence) may be correlated as the security threat information is received, and security threat information may be distributed to network components for enforcement of security policies with low latency between receiving the security threat information and reacting to the security threat information.

FIG. 1 illustrates an example of a computer security threat correlation system 100. The system 100 may include a computing network 102 accessible to a customer device 112. The computing network 102 may include network components 108 that facilitate communications between external computing networks and computing devices included in the computing network 102. Network components 108 may be network hardware appliances and/or network software components. For example, network components 108 may include routers, routing switches, integrated access devices (IADs), wide area network (WAN) devices, firewalls, gateways, WAFs, as well as other network applications and hardware. In one example, network components 108 may be implemented in software executing on a computing device. In another example, a computing instance may host the network components 108 implemented in software, where a computing instance may be a virtual machine (e.g., an instance of a software implementation of a computer) that executes applications like a physical machine.

Also included in the computing network 102 may be a multi-streaming data service 104 used to collect and distribute security threat information. In one example, the multi-streaming data service 104 may be a managed service (e.g., a data service) that can be elastically scaled to provide a data stream to subscribing network components (i.e., network hardware and network applications). For example, the multi-streaming data service 104 may receive input streams 116 of data records from network components 108, as well as other sources of security threat information, and provide the data records to network components 108 via output streams 114. The input stream 116 in FIG. 1 is shown as a solid line to illustrate security threat information that is pushed to the multi-streaming data service 104, and the output streams 114 are shown as a dotted line to illustrate multiple output streams 114 that are pushed to respective subscribing network components 108. Accordingly, one input stream 116 may be received by the multi-streaming data service 104, which may then be distributed as N number of output streams 114 to N number of subscribing network components 108.

Latency between the multi-streaming data service 104 receiving security threat information and the multi-streaming data service 104 providing the security threat information via multiple data streams may be low. Thus, the network components 108 may receive and consume the security threat information in a relatively short time period or near real-time (i.e., a period of time in which a first network component publishes security threat information to the multi-stream data service 104 and a second network component receives the security threat information via the multi-stream data service 104 in a brief amount of time that includes a limited delay that is not perceptible to a human).

As indicated above, the multi-streaming data service 104 may receive an input stream 116 that contains security threat information published by network components 108. The multi-streaming data service 104 may perform continuous intake and aggregation of the security threat information. In order to provide low latency output streams 114, minimal processing of the security threat information by the multi-streaming data service 104 may be performed. As an illustration, the multi-streaming data service 104 may receive security threat information for a URL from multiple network components 108. The multi-streaming data service 104 may aggregate the security threat information associated with the URL before sending the security threat information in multiple output streams 114 to subscribing network components 108.

In one example configuration, network components 108 may contain logic capable of recognizing specific security threats associated with network traffic and pushing security threat information into an input stream 116. As an illustration, an email security gateway may include logic that can recognize hyperlinks included in email messages that reference URLs associated with possible computer security threats. Upon recognizing a hyperlink associated with a computer security threat in an email message, the email security gateway may cause a security threat signature used for blocking the hyperlink to be pushed to the multi-streaming data service 104 by way of the input stream 116.

Included in a computer security threat correlation system 100 may be a security threat engine 118 that may receive security threat information from the multi-streaming data service 104. The security threat engine 118 may be an application associated with the multi-streaming data service 104 that consumes security threat information pushed to the multi-streaming data service 104 via an input stream 116. The security threat engine 118 may correlate security threat information obtained from an input stream 116 with additional security threat information (e.g., security threat information obtained from external sources, stored security threat information, network event logs, etc.).

As an illustration, an email protection application may receive an email containing a link to a questionable URL suspected of being associated with a phishing scheme. The email protection application may push security threat information (e.g., the URL and a tag that associates the URL with a possible phishing scheme) to the security threat engine 118. Upon receiving the security threat information from the email protection application, the security threat engine 118 may then correlate the security threat information with a government database, such as US-CERT (the United States Computer Emergency Readiness Team) for example. The government database may provide the security threat engine 118 with information about a phishing attack associated with the URL.

In one example, the correlated security threat information may be analyzed to identify a security threat associated with the correlated security threat information. For example, analysis of correlated security threat information may result in identification of a security threat type (e.g., a virus, IP/email spoofing, phishing, keylogging, denial-of-service attack, etc.). Based on an identity of a security threat, the security threat engine 118 may be push to network components 108 instructions and/or information for the security threat. In one example, a security threat may be pushed to subscribing network components 108 via the multi-streaming data service 104. In another example, the security threat engine 118 may communicate with a network component 108 directly via a network connection (not shown).

Continuing the example illustration above, having correlated the security threat information received from the email protection application with security threat information obtained from the government database, analysis performed by the security threat engine 118 may result in identifying a phishing security threat. Based on the identity of the security threat, the security threat engine 118 may instruct a group of web application firewalls (WAFs) in a group of network components 108 to disallow any internal connections to the URL, thereby preventing a connection to the URL by a recipient of the email who attempts to select a link that references the URL.

Alternatively, or in addition to the security threat engine 118, network components 108 may access security policy instructions that enable the network components 108 to correlate security threat information with additional security threat information received from the multi-streaming data service 104. As such, the network components 108 may be able to identify a computer security threat and execute the security policy instructions in response to the computer security threat. Thus, in some examples, the network components 108 may have the ability to consume security threat information and react to the security threat information autonomously.

A customer, using a customer device 112 may define a correlation policy for the customer's computing network 102. The correlation policy may specify sources of security threat information (e.g., external agencies, databases, etc.) to correlate with security threat information received from the network components 108 via the multi-streaming data service 104. A graphical user interface may be provided to a customer device 112 by way of a communications network 110 allowing a customer to view a graphical representation of network components 108 included in a threat intelligence infrastructure (e.g., network components 108 interconnected through a multi-streaming data service 104).

The graphical user interface may enable a customer to define a security policy relationship between various network components 108, where the security policy relationship may be used to execute security policy instructions associated with a computer security threat recognized by a network component 108 included in the security policy relationship. For example, a security policy relationship may enable selected network components 108 to share security threat information between the selected network components 108 via the multi-streaming data service 104 and/or query one another for specific security threat related information by way of the multi-streaming data service 104.

In one example, network components 108 that may be available for inclusion in a threat intelligence infrastructure may be discovered by way of metadata that includes a declarative policy for the network component 108. The declarative policy may specify network traffic information that the network component 108 may be capable of providing to the threat intelligence infrastructure. Further, the declarative policy may state security threat information that a network component 108 actually publishes to the multi-streaming data service 104.

Figure 2:
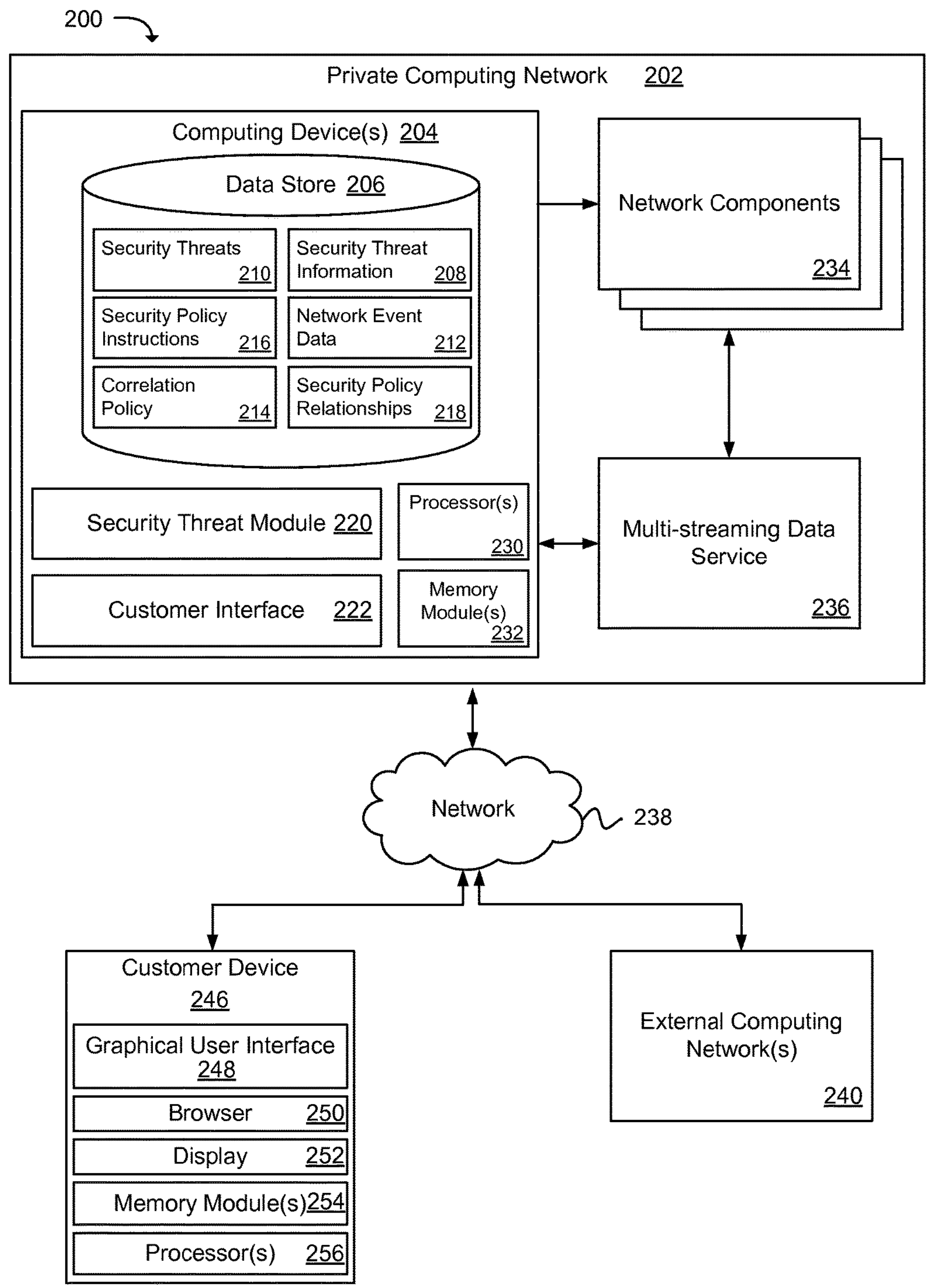
FIG. 2 is a block diagram illustrating an example of a system for computer security threat correlation showing various components included in the system.

FIG. 2 illustrates an example of various components of a system 200 on which the present technology may be executed. In one example configuration, the system 200 may include a private computing network 202 containing one or more computing devices 204, a number of network components 234 and a multi-streaming data service 236. A computing device 204 may be a server that may be in communication with a customer device 246 by way of a communications network 238, such as the Internet.

In one example configuration, a computing device 204 may include a data store 206, a security threat module 220, a customer interface 222, as well as other services, processes, systems, engines, or functionality not discussed in detail herein. The computing device 204 may host the security threat module 220, which may perform the functions of a security threat engine that correlates security threat information received from the multi-streaming data service 236 with additional security threat information 210, and analyzes the correlated security threat information to identify a security threat 210. For example, the security threat module 220 may subscribe to a data stream provided by the multi-streaming data service 236. Security threat information pushed to the multi-streaming data service 236 by the network components 234 may be pushed to the security threat module 220 via the data stream. The security threat information may then be correlated with additional security threat information obtained from a number of different sources that may include, archived security threat information 208, a database of known security threats 210, network event data 212 (e.g., network event logs), security threat information received from external computing networks 240, or any other source of security threat information.

Security threat information may be correlated based in part on various attributes of the security threat information. Illustratively, correlation of security threat information may be performed by identifying associations of IP (Internet Protocol) addresses, URLs, signature definitions, behavior patterns or other attributes included in the security threat information with additional security threat information. Security threat information may include a tag that provides details about a suspected security threat. For example, the tag may include information such as, "suspected phishing scheme associated with URL", "suspected virus behavioral pattern", "known malware", or other details pertaining to a suspected security threat.

The security threat module 220 may be in communication with external computing networks 240 for the purpose of obtaining security threat intelligence that may be correlated with security threat information received from the network components 234 via the multi-streaming data service 236. In one example, security threat information received from network components 234 may be shared with certain external computing networks 240. Illustratively, security threat information may be shared with government agencies, computer security consortiums, various private entities, or other entities that may utilize the security threat information.

Having correlated security threat information, the security threat module 220 may be used to identify a security threat 210 associated with the correlated security threat information and communicate the security threat 210 to the network components 234. For example, a database may be queried to identify one or more security threats 210 where the database may include associations that connect a security threat 210 to correlated security threat information. As one specific example, correlated security threat information may identify a suspected IP address associated with fraudulent use of a business name. Using the IP address and the business name to query a security threat database, the query may return an identified phishing scheme associated with the IP address and business name. The phishing security threat may then be communicated to various network components 234 through the multi-streaming data service 236.

In one example configuration, communication of a security threat 210 from the security threat module 220 to network components 234 may be transmitted via the multi-streaming data service 236. A security threat 210 transmitted to network components 234 may include security policy instructions 216 that instruct a network component 234 to perform certain actions in response to the security threat 210, such as block connections to a specific URL for example. In another example configuration, a security threat module 220 may provide a security threat 210 that may include security policy instructions 216 directly to one or more network components 234 through a network connection, such as a LAN (Local Area Network), WAN (Wide Area Network) or virtual network connection, for example.

Network components 234 included in a private computing network 202 may be network hardware appliances and/or network applications. Network applications may execute on one or more computing devices or may be hosted by one or more computing instances (i.e., an instance of a software implementation of a computer that executes applications like a physical machine). Examples of network components 234 that may be interconnected through a multi-streaming data service 236 may include routers, switches, bridges, gateways, wireless access points, firewalls, proxy devices, anti-virus systems, network address translation (NAT) devices, WAFs or any other device or application used in the transmission of network traffic through a computing network.

A network component 234 may both publish security threat information to a threat intelligence infrastructure (e.g., other network components 234 and/or one or more security threat modules 220) via the multi-streaming data service 236, and subscribe to a data stream provided by the multi-streaming data service 236 to receive security threat information as well as specific security threats 210. Included in a specific security threat 210 may be a security policy instruction(s) 216 that a network component 234 may execute in response to the specific security threat 210. In one example configuration, network components 234 may be configured with logic that enables a network component 234 to better collect security threat information, correlate security threat information and analyze security threat information received via the multi-streaming data service 236. Further, the network components 234 may be configured to react to an identified security threat according to a security policy for the network component 234 independent of security policy instructions 216 received from a security threat module 220.

In another example configuration, in addition to sharing security threat information via the multi-streaming data service 236, network components 234 may be configured to query a threat intelligence infrastructure via the multi-streaming data service 236 to obtain security threat information from other network components 234 included in the threat intelligence infrastructure. As an illustration, an edge device may receive network traffic sent from a source having an IP address that is associated with a recent port scan of the edge device. The edge device may query a threat intelligence infrastructure by sending a message via a multi-streaming data service 236 inquiring whether other network components 234 have been port scanned by a source having the same IP address. Responses to the query may be sent back to the edge device through the multi-streaming data service 236, whereupon the information included in the responses may be used to determine what to do with the network traffic.

The multi-streaming data service 236 may be a managed service configured to receive a plurality of input streams containing security threat information from various network components 234 within a private computing network 202, and configured to distribute the security threat information to a threat intelligence infrastructure via output streams upon immediately receiving the security threat information. In one example configuration, the multi-streaming data service 236 may be managed by a computing service provider, and in another example configuration, the multi-streaming data service 236 may be a customer managed service. A push access protocol may be used to push security threat information from publishing network components 234 to the multi-streaming data service 236, and to push security threat information from the multi-streaming data service 236 to subscribing network components 234. The multi-streaming data service 236 may be scalable in response to an amount of security threat information being received and distributed. Illustratively, the multi-streaming data service 236 may be executed by one or more computing instances. As an amount of security threat information streamed to and from the multi-streaming data service 236 increases or decreases, computing instances used to execute the multi-streaming data service 236 may be launched or released respectively.

In one example configuration, a customer interface 222 may provide a graphical user interface to a customer device 246 that enables a customer to define a correlation policy 214 for security threat information received via the multi-streaming data service 236. The correlation policy 214 may specify sources of security threat information to correlate with the security threat information received from the multi-streaming data service 236. For example, a customer may specify external computing networks 240 from which additional security threat information may be obtained, specify network event data that may be referenced, specify locations of stored security threat information 208, as well as other sources of security threat information not described herein. Also, a customer may define by way of the correlation policy 214 how security threat information is correlated. As one specific example, a customer may specify that suspicious external email addresses should be correlated with a database of known security threat email addresses. As another specific example, a customer may specify that failed login attempts should be correlated with a failed login events database.

A graphical user interface may also enable a customer to define security policy relationships 218 between various network components 234. Security policy relationships 218 may be referenced when executing security policy instructions 216 associated with a security threat 210 recognized by a network component 234 included in the security policy relationship. For instance, a relationship may be defined between two or more network components 234, such that security threat information may be shared between the network components 234, and that upon identification of a security threat 210, logic may be applied that causes an interaction between the network components 234 included in the relationship. A specific example of a security policy relationship 218 is described in greater detail below in relation to FIG. 6.

The private computing network 202, in one example, may comprise a computing service that includes a plurality of server computers that may be used to execute and manage a number of computing instances. Computing instances may be virtual machines. A virtual machine may be an instance of a software implementation of a machine (i.e., a computer) that executes applications like a physical machine. For example, a server computer may be configured to execute a hypervisor, virtual machine monitor (VMM), or another type of program configured to enable execution of multiple computing instances on a single server. Computing instances may be used to implement the multi-streaming data service 236, the network components 234 and/or the computing device 204, as can be appreciated.

A computing device 204 may be accessed by a customer device 246 via a customer interface 222 using API calls, procedure calls or other network commands that may be made to the computing device 204 according to different technologies, including, but not limited to, Representational State Transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A customer device 246 may include any device capable of sending and receiving data over a communications network 238. A customer device 246 may comprise, for example a processor-based system such as a computing device. Such a computing device may contain one or more processors 256, one or more memory modules 254 and a graphical user interface 248. A customer device 246 may be a device such as, but not limited to, a desktop computer, laptop or notebook computer, tablet computer, mainframe computer system, handheld computer, workstation, network computer, or other devices with like capability. A customer device 246 may include a browser 250 that may enable the customer device 246 to access a computing device 204 by way of a server side executed customer interface 222. The customer device 246 may include a display 252, such as a liquid crystal display (LCD) screen, gas plasma-based flat panel display, LCD projector, cathode ray tube (CRT), or other types of display devices, etc.

The various processes and/or other functionality contained on the computing device 204 may be executed on one or more processors 230 that are in communication with one or more memory modules 232 according to various examples. The computing device 204 may comprise, for example, of a server or any other system providing computing capability. Alternatively, a number of computing devices 204 may be employed that are arranged, for example, in one or more server banks or computer banks or other arrangements. For purposes of convenience, the computing device 204 is referred to in the singular. However, it is understood that a plurality of computing devices 204 may be employed in the various arrangements as described above.

Various data may be stored in a data store 206 that is accessible to the computing device 204. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data stores 206 may include storage systems such as a SAN (Storage Area Network), cloud storage network, volatile or non-volatile RAM, optical media, or hard-drive type media. The data store 206 may be representative of a plurality of data stores 206 as can be appreciated.

The communications network 238 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
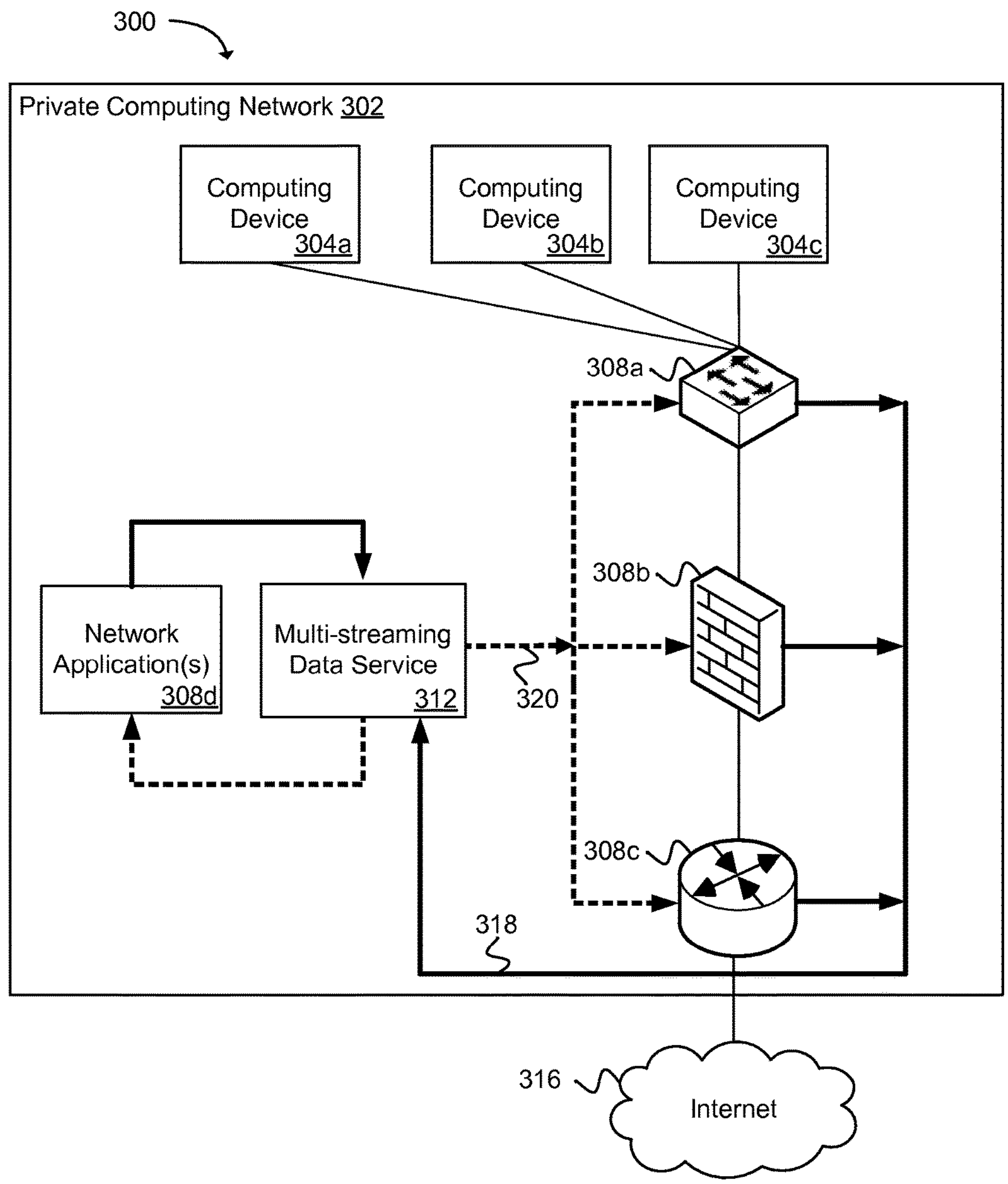
FIG. 3 is a diagram that illustrates an example of a threat intelligence infrastructure used to execute a method for computer threat correlation.

FIG. 3 illustrates an example threat intelligence infrastructure 300 that may be used to execute an example method for low latency computer threat correlation and distribution. The threat intelligence infrastructure 300 may comprise a number of interconnected network components 308*a-d* that facilitate network traffic between networks that include the Internet 316 and computing devices 304*a-c* contained in a private computing network 302. As illustrated, the network components 308*a-d* include a network router 308*c*, application firewall 308*b*, network switch 308*a* and network applications 308*d* (e.g., an email security application, intrusion detection application, identity authentication application, etc.).

The network components 308*a-d* may both publish and subscribe to a multi-streaming data service 312, such that the network components 308-*d* may push security threat information to the multi-streaming data service 312 via an input stream 318 for distribution to the threat intelligence infrastructure 300, and the multi-streaming data service 312 may in turn push security threat information to the individual network components 308*a-d* via an output stream 320. The multi-streaming data service 312 may be used to share security threat information among the network components 308*a-d*, collect security threat information provided by the network components 308*a-d*, and to transmit inquiries and responses among the network components 308*a-d* using the input stream 318 and output stream 320.

In the example configuration illustrated in FIG. 3, a network component 308*a-d* may be configured with security policy instructions that enable the network component 308*a-d* to correlate security threat information received from a multi-streaming data service 312 with additional security threat information received from the multi-streaming data service 312, or additional security threat information obtained from another source. Using the correlated security threat information, the network component 308*a-d* may identify a computer security threat and then execute the security policy instructions in response to the computer security threat.

As an illustration of an example method for correlating security threat information, a network application 308*d* acting as an email security gateway may detect a SPAM message containing hyperlinks to a suspicious URL. The network application 308*d* may push security threat information for the SPAM message to the multi-streaming data service 312, which may then push the security threat information for the SPAM message to other subscribing network components 308*a-c*. The other subscribing network components 308*a-c* may attempt to correlate the security threat information for the SPAM message with additional security threat information. For instance, an anti-virus network application 308*d* may receive the security threat information for the SPAM message and correlate the URL associated with the hyperlinks in the SPAM message with a known virus having a history of being downloaded from the URL. The network application 308*d* may then send an alert to an application firewall 308*b* via the multi-streaming data service 312 to block any content originating from the URL. As a result of the low latency between detecting the security threat associated with the URL and blocking content originating from the URL, protections against a computer attack may be implemented prior to an email recipient opening the SPAM message and selecting a hyperlink containing the URL.

In a further example configuration, a network component 308*a-d*, such as an edge device network component (e.g., a network router 308*c* or an application firewall 308*b*), may be configured to hold in memory suspicious network traffic (e.g., network packets) while a query is sent to other network components 308*a-d* via a multi-streaming data service 312 requesting security threat information related to the suspicious network traffic. Network components 308*a-d* having related security threat information may respond by pushing the security threat information to the multi-streaming data service 312, which may then be pushed to the requesting network component 308*a-d*. The requesting network component 308*a-d* may then make a determination based in part on the security threat information received whether to block the suspicious network traffic or to release the suspicious network traffic.

As an illustration of holding suspicious network traffic, a network router 308*c* may receive network packets originating from a source IP address associated with a recent port scan of the network router 308*c*, thus casting suspicion on the network packets. The network router 308*c* may hold the network packets in memory while a query is sent to a threat intelligence infrastructure 300 via a multi-streaming data service 312 inquiring whether other network components 308*a-d* have recently been port scanned by a source having the IP address. Based in part on responses received, the network router 308*c* may make a determination of whether to forward the network packets to a destination computing device 304*a-c*, or whether to block the network packets from leaving the network router 308*c*.

In another example configuration, the threat intelligence infrastructure 300 may include a centralized security threat engine (not shown) that may receive security threat information via the multi-streaming data service 312, correlate the security threat information with additional security threat information and identify a computer security threat associated with correlated security threat information. The centralized security threat engine may then communicate the computer security threat via the multi-streaming data service 312 to the network components 308*a-d*.

Figure 4:
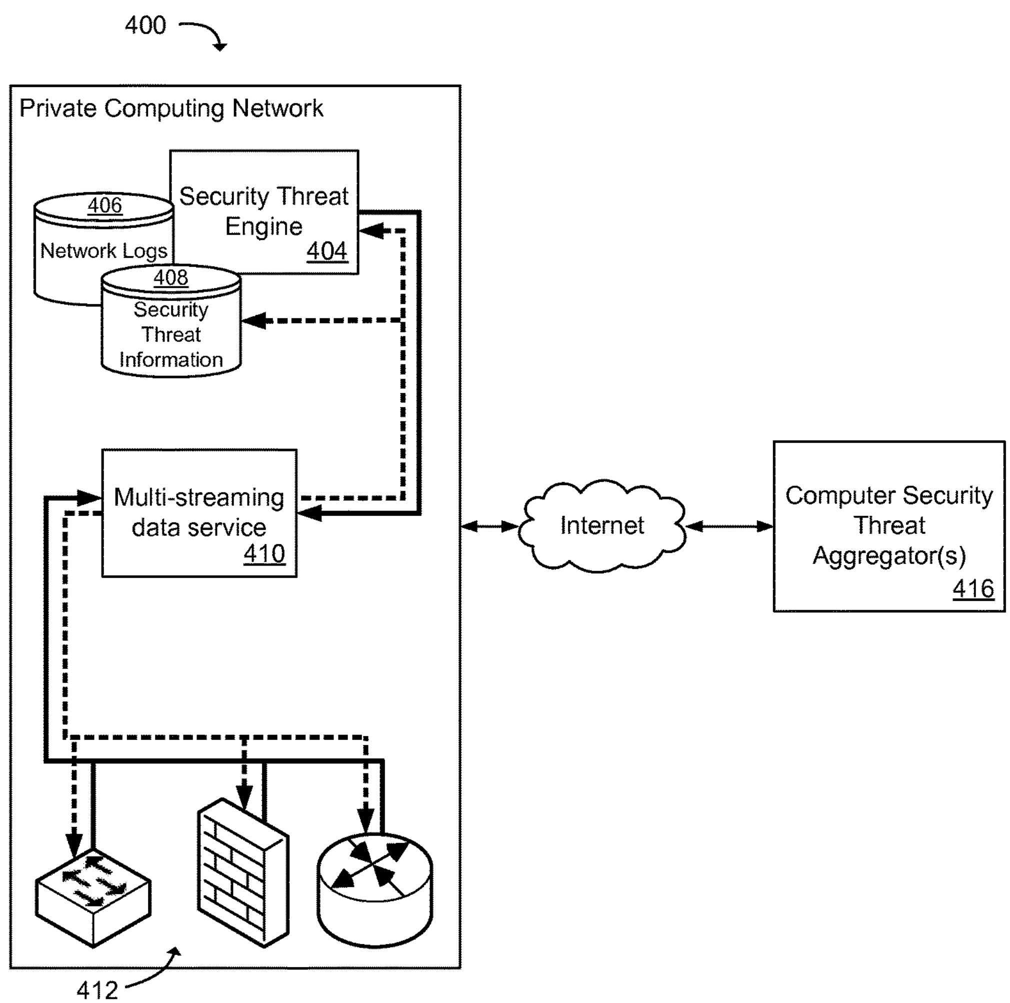
FIG. 4 is a diagram illustrating an example of a threat intelligence infrastructure used to execute a method that correlates security threat information with additional security threat information.

FIG. 4 is an illustration of an example threat intelligence infrastructure 400 used to execute an example method for correlating security threat information with additional security threat information obtained from internal network data stores and/or security threat information obtained from a computer security threat aggregator 416. Examples of security threat information that may be obtained from internal network data stores may include, but are not limited to, network logs 406 that may contain a history of network events (e.g., network authentication attempts, network traffic flow, port scans, etc.) and stored security threat information 408. A security threat aggregator 416 may include, but is not limited to, government agencies, computer security consortiums, private entities, or any other entity that may aggregate and share security threat information.

In one example, network components 412 may push security threat information to a multi-streaming data service 410 that may then push the security threat information to a security threat engine 404, as well as to a data store for stored security threat information 408. The security threat engine 404 may attempt to correlate security threat information with various sources of additional security threat information. Illustratively, the security threat engine 404 may obtain additional security threat information from network logs 406, stored security threat information 408 and/or one or more computer security threat aggregators 416. Alternatively, or in addition to the security threat engine 404, network components 412 may obtain additional security information from network logs 406, stored security threat information 408 and/or a plurality of computer security threat aggregators 416.

Figure 5:
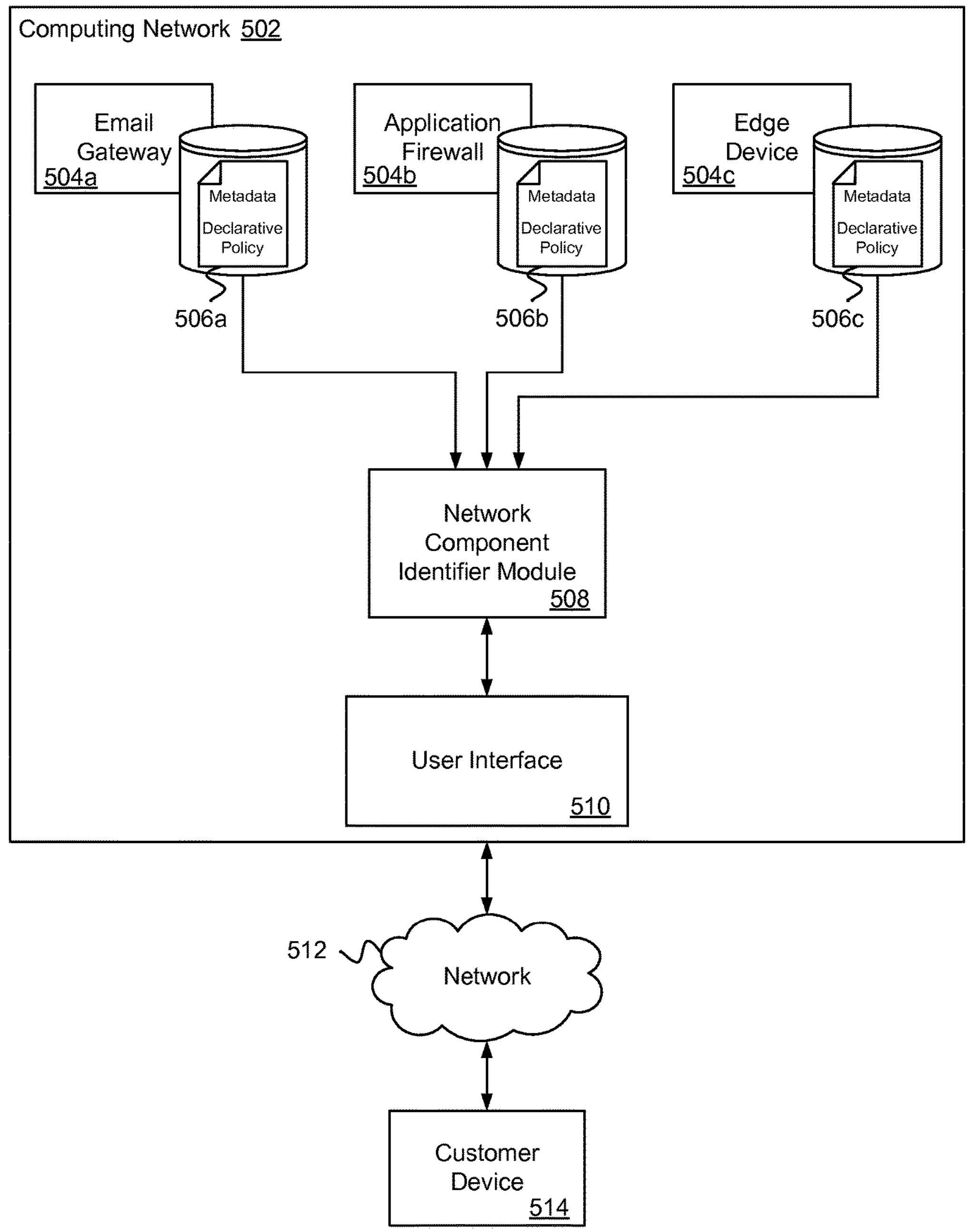
FIG. 5 is a block diagram that illustrates an example of computing components included in a threat intelligence infrastructure that may be identified via a declarative policy.

FIG. 5 illustrates an example computing network 502 that includes a number of computing components 504*a-c* that may be managed via a declarative policy 506*a-c* enabling a network administrator and/or a customer to establish relationships between the computing components 504*a-c*. A network component 504*a-c* may be included in a declarative policy 506*a-c* that may be discoverable via metadata declaring security threat information that the network component 504*a-c* may be capable of providing to a threat intelligence infrastructure. Further, the declarative policy 506*a-c* may state what security threat information the network component 504*a-c* may be currently providing. As a specific example, an email gateway 504*a* may declare in a declarative policy 506*a* that the email gateway 504*a* is capable of providing email related security threat information that includes send from addresses, sent to addresses, subject header data, email body data that includes imbedded hyperlink data. The declarative policy 506*a* may also state that the email gateway 504*a* is presently providing send from addresses to a threat intelligence infrastructure.

Illustratively, a network component identifier module 508 may be used to identify network components 504*a-c* within a computing network 502 that can contribute security threat information to the threat intelligence infrastructure. The network component identifier module 508 may identify a network component 504*a-c* by querying a data store containing metadata for a declarative policy 506*a-c* for the network component 504*a-c* and provide declarative policy information to a user interface 510. Metadata for a network component 504*a-c* may be stored separately as illustrated, or may be stored in a common data store as can be appreciated.

The user interface 510 may be accessible to a customer device 514 by way of a network 512. A customer and/or a network administrator may access the user interface 510 in order to define a security policy relationship between various network components 504*a-c*. For example, the security policy relationship may allow selected network components 504*a-c* to share security threat information between the selected network components 504*a-c* via a multi-streaming data service and/or query one another for specific security threat related information by way of the multi-streaming data service. Further, the customer and/or systems administrator may configure a security policy relationship by specifying security threat information a network component 504*a-c* will provide to a threat intelligence infrastructure, as described above.

Figure 6:
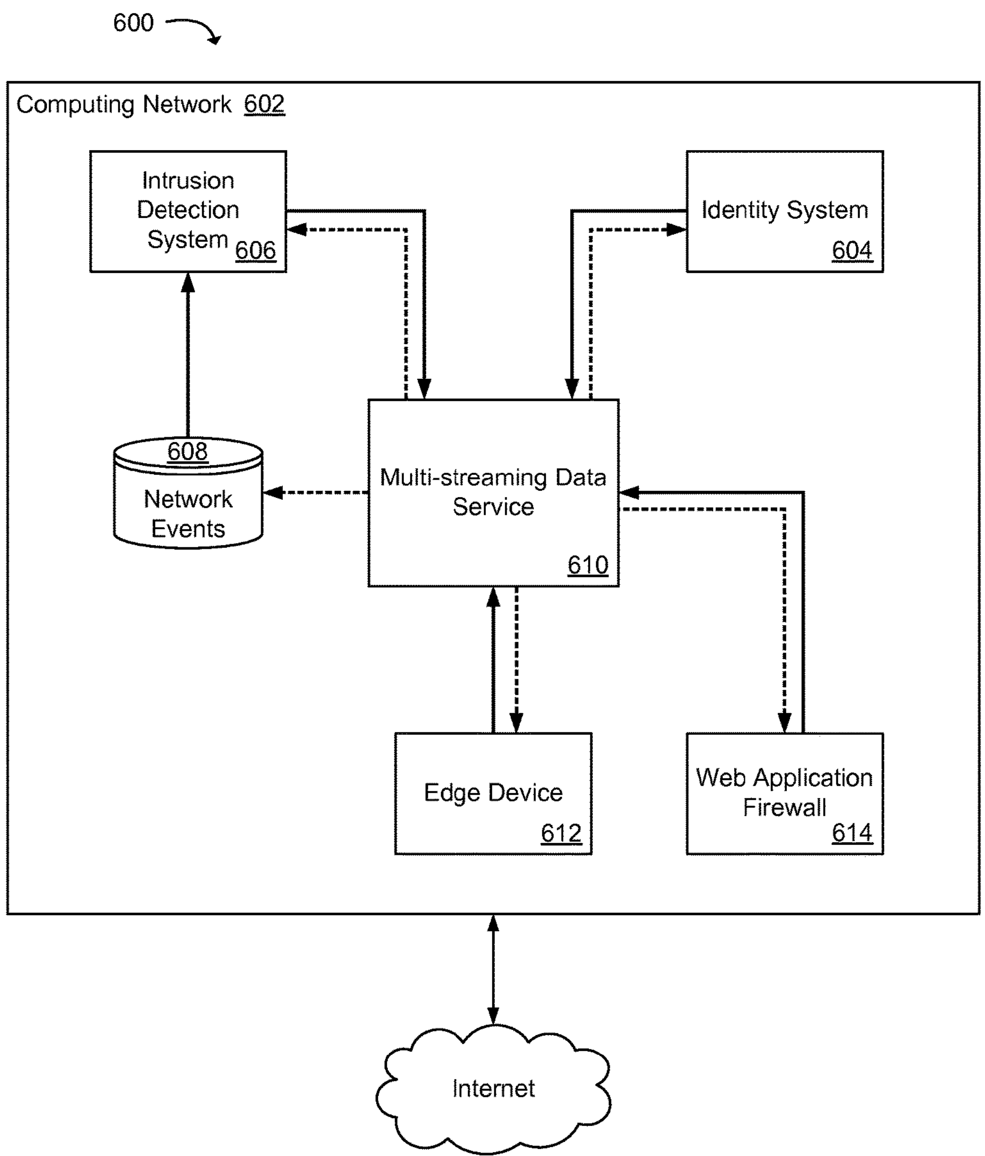
FIG. 6 is a block diagram illustrating an example of a threat intelligence infrastructure showing a security policy relationship that may be defined between network components.

FIG. 6 is an illustration of a threat intelligence infrastructure 600 showing one specific example of a security policy relationship that may be defined by a customer, systems administrator or the like. As illustrated, the security policy relationship may include an identity system 604, an intrusion detection system 606, an edge device 612, a web application firewall 614 and a network events database 608 that are interconnected through a multi-streaming data service 610. The security policy relationship may specify that the identity system 604 push security threat information related to failed network login attempts to a multi-streaming data service 610, which in turn may push the security threat information to the network events database 608 and the intrusion detection system 606. The security threat information may be stored in the network events database 608 for a period of time (e.g., days, weeks, etc.). The intrusion detection system 606 may be configured to correlate security threat information related to failed login attempts with security threat information obtained from the network events database 608. As a specific example, security threat information for a failed login attempt for an account may be correlated with past failed login attempts related to the same account and with port scan activity originating from an external network associated with the failed login attempts.

The intrusion detection system 606 may be configured with logic via security policy instructions that enable the intrusion detection system 606 to analyze correlated security threat information. Continuing the specific example above, security policy instructions may specify that if there have been X number (e.g., 3, 5, etc.) of failed login attempts originating from an IP address, and that the IP address is associated with a recent port scan of servers included in the computing network 602, then instruct the web application firewall 614, by way of the multi-streaming data service 610 to block content originating from the IP address. Similar instructions may be transmitted through the multi-streaming data service 610 to an edge device 612, thereby proactively locking out network traffic originating from the IP address.

As illustrated, the network components included in the security policy relationship are described as correlating security threat information, identifying a security threat and executing security policy instructions in response to the security threat. Alternatively, or in addition to, a centralized security threat engine or multiple security threat engines may be included in a security policy relationship that performs the actions described above.

Figure 7:
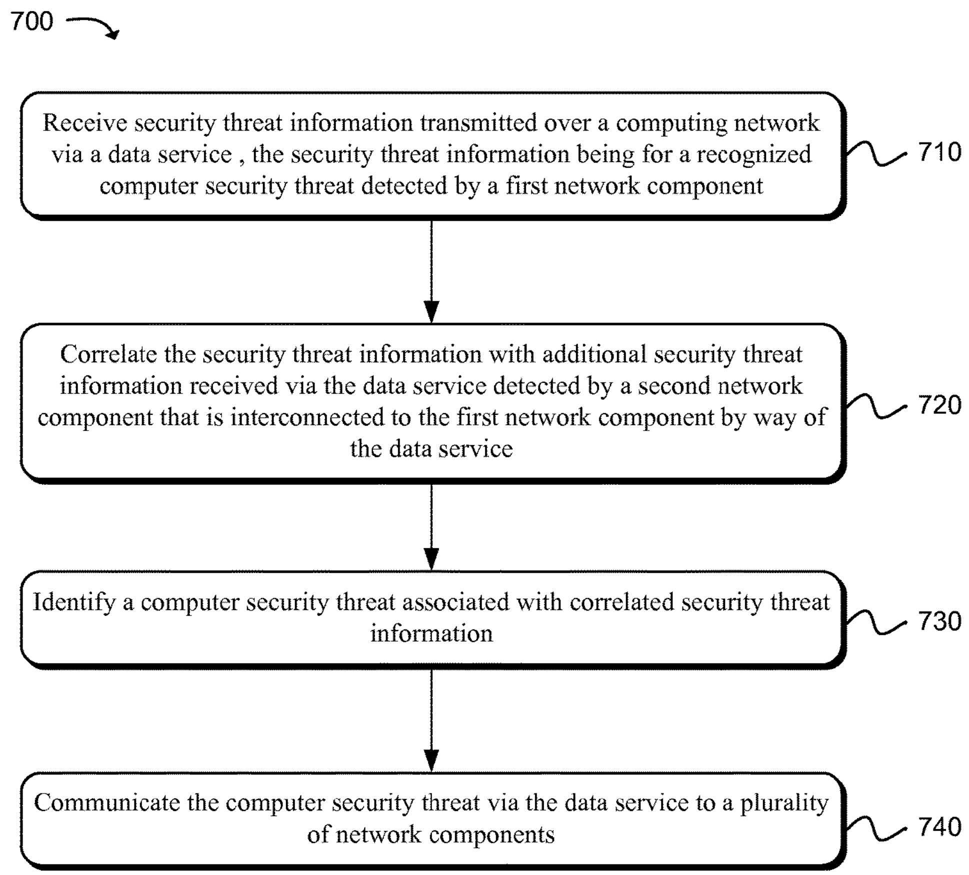
FIG. 7 is a flow diagram that illustrates an example of a method for correlating security threat information.

FIG. 7 is a flowchart illustrating an example of a method 700 for correlating security threat information obtained from various network components included in a threat intelligence infrastructure. Beginning in block 710, security threat information transmitted over a computing network may be received via a multi-streaming data service, the security threat information being for a recognized computer security threat detected by a first network component. The multi-streaming data service may be a scalable managed service that streams large amounts of data to network components included in a security policy relationship, as described earlier. Network components may be configured with logic that enables the detection of security threat information (e.g., information related to suspicious network traffic) that may be related to a computer security threat.

As in block 720, the security threat information received from the first network component may be correlated with additional security threat information received via the multi-streaming data service. The additional security threat information may be detected by a second network component that is interconnected to the first network component by way of the multi-streaming data service. In addition, the security threat information received from the first network component may be correlated with additional security threat information obtained from a computer security threat aggregator that is external to the computing network, as well as with data obtained from an internal network data store containing network event data.

As in block 730, a computer security threat associated with correlated security threat information may be identified. For example, based in part on the correlated security threat information, a specific computer security threat may be identified, such as a virus, malware, denial-of-service attack, phishing attack or other type of computer security threat.

Having identified a computer security threat, as in block 740, the computer security threat may be communicated via the multi-streaming data service to a plurality of network components. Those network components receiving the computer security threat may be network components that subscribe to the multi-streaming data service in order to receive computer security threat information that may be relevant to the network components. As a specific example, an intrusion detection system may subscribe to the multi-streaming data service in order to receive computer security threat information related to intrusions into a computer network.

A network component that receives the computer security threat may execute security policy instructions in response to the computer security threat upon receiving the communication for the computer security threat. In one example, the security policy instructions may be included in the communication for the computer security threat. As an illustration, a network edge device may receive instruction to refuse network traffic from a specific IP address. In another example, a receiving network component may be configured with security policy instructions allowing the network component to act accordingly when a computer security threat is received. For example, an anti-virus system may be configured to search for and remove malware upon receiving security threat information indicating that the malware has infiltrated a computing network.

For simplicity of explanation, the method depicted in FIG. 7 is described as a series of acts. However, acts in accordance with this disclosure can occur in various orders and/or concurrently, and with other acts not presented and described herein. Furthermore, not all illustrated acts may be included in implementations of the method in accordance with the disclosed subject matter. In addition, the methods could alternatively be represented as a series of interrelated states via a state diagram or events.

Figure 8:
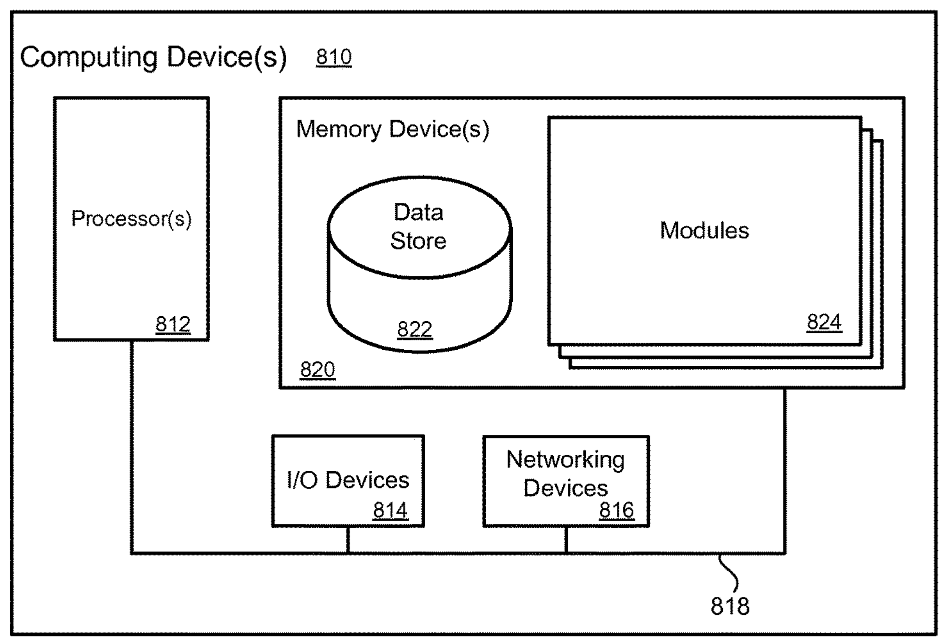
FIG. 8 is block diagram illustrating an example of a computing device that may be used to execute a method for correlating security threat information.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. For example, the memory device 820 may contain a security threat module and a user interface module. The modules 824 may execute the functions described earlier. A data store 822 may also be located in the memory device 820 for storing data related to the modules and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device may be a display screen that is available to display output from the computing devices. Other known I/O devices may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:

receive, at a security threat engine, a data stream containing security threat information streamed by a scalable multi-streaming data service to the security threat engine, wherein the security threat information includes security threats detected by a network component included in a computing network, and the network component sends the security threat information to the scalable multi-streaming data service, wherein the scalable multi-streaming data service is a managed streaming data service that is scaled to receive input data streams of security threat information from network components using a push access protocol and send the security threat information in output data streams to multiple subscribing network components in parallel using the push access protocol;

correlate the security threat information with additional security threat information using the security threat engine, forming correlated security threat information, wherein the additional security threat information is received in the data stream provided by the scalable multi-streaming data service, and the additional security threat information is detected by other network components within the computing network, and correlation of the security threat information with the additional security threat information comprises identifying attributes of the security threat information and the additional security threat information that show a relationship between the security threat information and the additional security threat information;

identify a computer security threat associated with the correlated security threat information using the security threat engine; and send the computer security threat to the scalable multi-streaming data service, which sends the data stream containing the computer security threat to network components to enable the network components to execute security policy instructions associated with the computer security threat.

2. A non-transitory machine readable storage medium as in claim 1, wherein instructions that when executed by the processor further subscribe to the data stream transmitted by the scalable multi-streaming data service that receives the security threat information published by the network components included in the computing network and sends the security threat information via the data stream to the multiple subscribing network components within the computing network.

3. A non-transitory machine readable storage medium as in claim 1, wherein instructions that when executed by the processor further correlate the security threat information with additional security threat information obtained from a source that is external to the computing network.

4. A computer implemented method, comprising:

receiving, at a computing device having a processor, a data stream providing security threat information transmitted over a computing network by a scalable multi-streaming data service, wherein the security threat information includes a recognized computer security threat detected by a first network component that sent the recognized computer security threat to the scalable multi-streaming data service, wherein the scalable multi-streaming data service is a managed streaming data service that is scaled to receive input data streams of security threat information from network components using a push access protocol and to send the security threat information in output data streams to multiple subscribing network components in parallel using the push access protocol;

correlating, at the computing device using the processor, the security threat information with additional security threat information, forming correlated security threat information, wherein the additional security threat information is received via the scalable multi-streaming data service, and the additional security threat information is detected by a second network component that is interconnected to the first network component by way of the scalable multi-streaming data service, and correlation of the security threat information with the additional security threat information comprises identifying attributes of the security threat information and the additional security threat information that show a relationship between the security threat information and the additional security threat information;

identifying, at the computing device using the processor, a computer security threat associated with the correlated security threat information; and sending, from the computing device using the processor, the computer security threat to the scalable multi-streaming data service, which sends the data stream containing the computer security threat to the subscribing network components.

5. A method as in claim 4, wherein communicating the computer security threat to the subscribing network components further comprises executing security policy instructions to address the computer security threat in response to the computer security threat upon receiving a communication for the computer security threat.

6. A method as in claim 4, wherein the scalable multi-streaming data service receives subscription requests for the security threat information published by the subscribing network components included in the computing network for distribution via the data stream to subscribing network components.

7. A method as in claim 6, wherein the scalable multi-streaming data service performs intake and aggregation of the security threat information and sends aggregated security threat information in the output data streams to the multiple subscribing network components.

8. A method as in claim 4, wherein receiving security threat information via the scalable multi-streaming data service transmitted over a computing network further comprises:

publishing, by the subscribing network components, of recognized security threat information to the scalable multi-streaming data service; and subscribing of the subscribing network components to the scalable multi-streaming data service to receive security threat information.

9. A method as in claim 4, wherein the subscribing network components have security policy instructions that enable the subscribing network components to correlate the security threat information with additional security threat information received in the data stream from the scalable multi-streaming data service and identify the computer security threat and execute the security policy instructions in response to the computer security threat.

10. A method as in claim 4, further comprising discovering a network component via a declarative policy that specifies security threat information the network component is capable of providing and security threat information the network component publishes to the scalable multi-streaming data service.

11. A method as in claim 10, wherein discovering the network component further comprises referencing metadata for the network component that includes the declarative policy for the network component.

12. A method as in claim 4, wherein correlating the security threat information further comprises correlating the security threat information with the additional security threat information obtained from a computer security threat aggregator that is external to the computing network.

13. A method as in claim 4, wherein correlating the security threat information further comprises correlating the security threat information with the additional security threat information obtained from an internal network data store containing network event data.

14. A method as in claim 4, wherein communicating the computer security threat to the subscribing network components further comprises instructing a network component to disallow network connections to an external computing device identified as a source of the computer security threat.

15. A method as in claim 4, further comprising providing a graphical user interface to a client device enabling a customer to define a correlation policy for security threat information received via the scalable multi-streaming data service, the correlation policy specifying sources of security threat information to correlate with the security threat information included in the data stream received from the scalable multi-streaming data service.

16. A method as in claim 4, further comprising providing a graphical user interface to a client device that enables a customer to define a security policy relationship between network components, wherein the security policy relationship is used in executing security policy instructions associated with the computer security threat recognized by a network component included in the security policy relationship.

17. A system comprising:

a processor;

a data store for stored security threat information;

a memory device including instructions that, when executed by the processor, cause the system to:

receive a data stream transmitted over a computing network by a scalable multi-streaming data service, the data stream containing security threat information for a recognized computer security threat detected by network components, wherein the scalable multi-streaming data service is a managed streaming data service that is scaled to receive input data streams of security threat information from network components using a push access protocol and to send the security threat information in output data streams to multiple subscribing network components in parallel using the push access protocol;

correlate the security threat information with additional security threat information forming correlated security threat information that includes stored security threat information that is retrieved from the data store and security threat information received via the scalable multi-streaming data service detected by other network components, wherein correlation of the security threat information with the additional security threat information comprises identifying attributes of the security threat information and the additional security threat information that show a relationship between the security threat information and the additional security threat information;

identify a computer security threat associated with the correlated security threat information; and send the computer security threat to the scalable multi-streaming data service that sends the data stream containing the computer security threat to network components, wherein the network components receive the data stream containing the computer security threat and execute security policy instructions associated with the computer security threat to address the computer security threat.

18. A system as in claim 17, wherein the memory device includes instructions that, when executed by the processor, causes the system to correlate the security threat information with security threat information obtained from a computer security threat aggregator that is external to the computing network.

19. A system as in claim 17, wherein the memory device includes instructions that, when executed by the processor, causes the system to provide a user interface to a client device enabling a customer to define relationships between various network components and to define security policy instructions.

* * * * *